Patented July 14, 1953

2,645,577

UNITED STATES PATENT OFFICE 2,645,577

PURIFYING WOOD PULP

Stanley Charles Bate, Francis George Peach, and Walter Alan Rogerson, Spondon, near Derby, England, assignors to British Celanese Limited, a company of Great Britain No Drawing. Application April 8, 1950, Serial No. 154,886. In Great Britain May 20, 1949

4 Claims. (Cl. 92—13)

This invention relates to the production of cellulose suitable for conversion into cellulose derivatives such, for example, as cellulose acetate.

In making cellulose acetate and other cellulose derivatives the primary raw material is of course cellulose itself, and it is generally recognized that, if a good quality product is to be obtained, the cellulose starting material must have a high degree of purity; in particular it should have a high alpha-cellulose content, preferably over 92% and especially round about 95% or higher, and a low pentosan content, preferably below 1%. In the past, cellulose of the necessary degree of purity has been obtainable without difficulty from cotton linters, which are among the purest natural forms of cellulose available on a commercial scale. Much work has, however, been done on the production of cellulose from other sources, especially wood and cereal straw.

Cellulose can be obtained from wood, straw and other ligno-cellulosic materials by a number of different processes, of which the most important are the sulphite, soda and kraft or sulphate processes and their various modifications. The cellulose immediately obtained by these processes, however, is by no means pure enough for conversion into good quality cellulose acetate, and many investigations have been carried out with a view to finding methods of purifying it sufficiently without degrading it so far that a cellulose acetate of satisfactory viscosity cannot be obtained. Most of the processes developed comprise one or more treatments with an alkaline reagent, usually aqueous caustic soda of various concentrations, and one or more bleaching steps. For example, U. S. Patent No. 2,054,854 shows that successive treatment with a boiling caustic soda solution of concentration about ½%–3% and a cold caustic soda solution of concentration about 12%–15%, followed if desired by a bleach, will convert wood pulps into cellulose sufficiently pure for acetylation. While this process gives a good product, the need for employing two or more distinct chemical treatments is a disadvantage, and considerable difficulty is sometimes found in filtering the cellulose from the cold concentrated alkali solution. British Patent No. 470,764 describes treating wood pulp alternately with boiling dilute alkali solutions and bleaching solutions, at least two stages of each kind being used. British Patent No. 509,938 describes, among other things, a purification treatment comprising a treatment with a cold caustic soda solution of concentration 12%–20% and one or more bleaching steps; here again, there may be difficulties in filtering off the cellulose from the alkali solution.

In U. S. application S. No. 75,963 filed February 11, 1949, there is described a process for purifying commercially available wood pulps and other cellulosic materials of already fairly high alpha-cellulose content, with a view especially to their use in the manufacture of cellulose esters of good quality. This process consists in subjecting the cellulosic material, which preferably has already an alpha-cellulose content above 85% and a pentosan content below 3.5%, to the action of an aqueous caustic alkali solution of concentration between 15% and 22%, and especially between 17% and 19%, at a temperature between 40° and 60° C. (These concentrations, and all alkali concentrations mentioned in this specification, are calculated on a weight/volume basis, i. e. in grammes of alkali per 100 cc. of solution.) After this digestion treatment, which is generally best continued for between about 45 and 90 minutes, as much of the alkali solution as possible may be filtered off or otherwise removed without diluting it, and this solution, if necessary after the addition of some fresh alkali, is available for re-use. The cellulose is then washed free from alkali, preferably mainly or entirely with water at a temperature of 70°–100° C. (if cold water is employed the clarity of cellulose acetate made from the purified cellulose may suffer considerably); for example, the bulk of the residual alkali may be washed out with water at 80°–90° C., after which the cellulose may if desired be given a wash with acidified water, followed by a final wash with water free from acid. It is shown in U. S. application Serial No. 75,963 that cellulose obtained in this way from a given pulp has been found on acetylation to give a cellulose acetate of higher clarity than cellulose obtained by subjecting the same pulp to known treatments of greater complexity, and that the new process does not involve filtration difficulties.

We have now found that, in certain circumstances, the quality of the purified cellulose as expressed in terms of the clarity of cellulose acetate obtainable therefrom may be still further improved by subjecting the cellulose, after the treatment with the alkali as described above, to the action of boiling water for a period of at least 15 minutes. More particularly, we have found that this boil with water is advantageous when the cellulose, before the actual esterification, is subjected to an acid pretreatment (e. g. with a lower fatty acid with or without part of the acetylation catalyst as well known in the industry) lasting less than 6 hours, and especially for 4 hours or less, at a temperature not exceeding about 35° C., and especially at about 20°-30° C. Substantially longer acid pretreatments at such temperatures, for instance pretreatments lasting for about 12-20 hours, have been found to have a favourable influence on the clarity of the cellulose acetate ultimately obtained similar to that exerted by the boil with water, but of course in many cases this extra time required is a serious disadvantage. Again, an occasional sample of wood pulp may be found which appears to have an inherent reactivity such that, even without either the boil with water or the long acid pretreatment, a cellulose acetate of exceptionally good clarity is obtained. The factors making for such favourable reactivity are, however, not understood, nor is it possible to guarantee that any particular batch of pulp will possess it. We thus prefer to employ the boil with water as a standard operation following the treatment with caustic alkali of 15%-22% concentration described in U. S. application Serial No. 75,963.

According to the present invention, therefore, wood pulps and other impure cellulosic materials, especially wood and straw pulps and the like having an alpha-cellulose content above 85% and a pentosan content below 3.5%, are treated by digesting them with an aqueous caustic alkali solution of concentration between 15% and 22%, and especially between 17% and 19%, at a temperature between 40° and 60° C., and after removal of all or substantially all of the alkali, are boiled with water for a period of at least 15 minutes.

For the sake of clarity and conciseness the invention will be more particularly described by reference to the treatment of cellulosic materials derived from wood, straw or other ligno-cellulosic substances, hereinafter referred to as "pulps." The product of the alkali treatment (before and after it is washed or given the water boil as described in more detail below) will be referred to as "purified cellulose"; this is not of course to be taken as implying that the product of the alkali treatment consists of absolutely pure alpha-cellulose.

We have found that by means of the new process it is possible to obtain purified cellulose having an alpha-cellulose content above 92% and in most cases round about 95%, and a pentosan content below 1%, which is sufficiently reactive and uniform to be readily converted into cellulose acetate of satisfactory clarity and viscosity after a comparatively short acid pretreatment of a usual kind. Moreover, the yield of purified cellulose obtained from the pulp is exceptionally high, indicating that little or no useful material has been removed from the pulp with the impurities, and the separation of the purified cellulose from the alkali solution by filtration gives rise to no difficulty. No bleaching step is necessary after the alkali treatment.

It is usually preferable to employ more than 7 parts by weight, and especially 9-12 parts, of the alkali solution for each part (on an air-dry basis) of the pulp. It is advisable to preheat the alkali solution to about the treatment temperature before introducing the pulp; the actual treatment may, for example, last for between 45 and 90 minutes, 60 minutes being usually a suitable time. At the end of the treatment the greater part of the alkali solution may be removed, conveniently by filtration, though other methods, especially methods such as centrifuging in which no dilution of the solution occurs, may be used; the alkali concentration of the solution removed by such methods is not as a rule very much lower than its concentration before the treatment, and it is one of the advantages of the invention that this waste alkali, after its concentration has if necessary been made up by the addition of fresh alkali, e. g. in the solid form or as a concentrated aqueous solution, can be used repeatedly.

The alkali which is not removed by filtration, or in some analogous way, may now be washed out of the purified cellulose, for example with cold water or if desired with water at a temperature above room temperature, e. g. at a temperature about 70°-90° C. or higher. (The use of cold water for the washing has not the adverse effect on the clarity of cellulose acetate subsequently made from the purified cellulose as it may have in the absence of the water boil.) Residual alkali may if desired be removed by giving the purified cellulose a wash with acidified water (i. e. water containing less than 1%, and preferably less than 0.5%, of acetic, sulphuric or other acid) and preferably then washing again with water alone until the washings are substantially neutral.

For the water boil there may be used mains water, river water or the like (filtered if necessary), a treated water such as a demineralised or distilled water, or acidified water (as defined above); in general, mains water or river water is found to be quite satisfactory, though it may be found advisable to give very hard waters a softening or demineralising or like treatment. If desired the water boil may be combined with one of the final washing stages; for example, when acidified water is used the purified cellulose may be boiled therewith for 15 minutes or more, after which a final water wash may be given, preferably at a temperature above 80° C. and especially at the boiling point. Again, when the purified cellulose has been washed with acidified water without boiling, residual acid may be removed by boiling the cellulose for 15 minutes or more with water which initially is substantially neutral, i. e. which has no more than a natural acidity or alkalinity.

The water boil, whether it forms part of the washing or is a completely separate operation, is preferably continued for 15-45 minutes; it is sufficient to effect the boil under atmospheric pressure.

As already indicated, an important effect of the boil with water is to activate the purified cellulose for a subsequent esterification treatment, and cellulose purified by the new process is therefore particularly valuable in the production of cellulose esters, especially cellulose esters of lower aliphatic acids (i. e. aliphatic acids containing up to 4 carbon atoms) such, for example, as cellulose acetate, cellulose propionate, cellulose butyrate, cellulose crotonate, and mixed esters containing for example acetyl groups and propionyl, butyryl or crotonyl groups. It may however also be employed for other purposes, for instance for the manufacture of cellulose ethers, e. g. water-soluble methyl cellulose, hydroxyethyl methyl cellulose, hydroxyethyl ethyl cellulose, carboxymethyl cellulose and methyl ethyl cellulose, and also of cellulose ethers soluble in organic solvents, for example ethyl cellulose of a moderately high or high ethoxyl content and benzyl cellulose. Cellulose purified by the new process can also be used in the production of viscose and cuprammonium solutions. Cellulose acetate and other cellulose derivatives made from cellulose purified by the new process can be used, for example, for the manufacture of filaments and other textile materials, of films, foils and the like, and of plastic compositions, for example moulding powders.

The invention is illustrated by the following example which shows the result of treating three different wood pulp samples, having pentosan contents between 1.9% and 2.7%, by the process described above, and also by the same process without the water boil:

Example

The wood pulp was introduced into ten times its weight of an 18% (weight/volume) aqueous solution of caustic soda which was already at a temperature of 50°–55° C., and the mixture was kept at this temperature for 60 minutes while stirring. As much of the caustic soda as possible was then removed by filtration, and the caustic soda remaining in the cellulose was washed out with cold water; the purified cellulose was then boiled with water for 30 minutes under atmospheric pressure. The product was pretreated with acetic acid for either 4 or 16 hours and then acetylated using acetic anhydride as the acetylating agent, sulphuric acid as catalyst, and further acetic acid to dissolve the cellulose acetate formed. In each case a good quality cellulose acetate of satisfactory clarity was obtained.

In the table below comparative figures are given for the clarity of cellulose acetate made from the three different wood pulps by identical purification and acetylation processes as described above, except for the modifications indicated. It will be understood that the figures are intended to be comparative only, since different samples of pulp even from a single mill are found to give acetates of somewhat differing clarity.

| Wood Pulp Sample No. | Acid Pretreatment, 4 hours | | Acid Pretreatment, 16 hour | |
|---|---|---|---|---|
| | Boil | No Boil | Boil | No Boil |
| 1 | 42 | 21 | 45 | 42 |
| 2 | 20 | 15 | 22 | 28 |
| 3 | 36 | 23 | 38 | 39 |

It will be seen that, in each case, with a 4 hour pretreatment a very considerable improvement in clarity (with Sample No. 1 100%) was produced by the water boil. With a 16 hour pretreatment the boil had in two cases little effect, and in the third actually reduced the clarity. The table also shows that the effect of the boil is roughly equivalent to that of increasing the pretreatment time from 4 to 16 hours.

Although, as stated above, the new process is particularly valuable when employed as the only purification given to a pulp having an alpha-cellulose content of at least 85% and a pentosan content below 3.5%, it can also be applied to other pulps, either alone or in association with other purification steps; or, when applied to relatively pure pulps having the composition specified, it can if desired be associated with other purification steps. For example, a pulp of lower alpha-cellulose and higher pentosan contents than those specified above may first be given a bleach, e. g. with chlorine or with an alkaline hypochlorite solution, and then be treated in accordance with the present invention. Again, when treating a relatively pure pulp, the new process may be preceded or followed by a boil under atmospheric or higher pressure with a very dilute alkali solution, e. g. with a caustic soda solution of concentration 1%–3%, or it may be followed by a hypochlorite bleach, the purified cellulose always being given a boil with water as described above. It is also applicable to other forms of cellulose, for example cotton linters. In general, however, it may be said that the main value of the new process is that, when applied to relatively pure pulps of a type now readily available, it gives in a single chemical operation (apart from the water-boil), and without operational difficulties, cellulose which is suitable for conversion into cellulose acetate and other cellulose derivatives of good quality.

Having described our invention, what we desire to secure by Letters Patent is:

1. Process for purifying wood pulps having an alpha-cellulose content above 85% and a pentosan content below 3.5% whereby there is obtained a cellulose suitable for esterification, which comprises digesting the pulp with an aqueous caustic soda solution of 17–19% concentration at a temperature of 50°–55° C. for 45 to 90 minutes as the only chemical purifying operation, then removing the greater part of the alkali solution from the digested pulp while maintaining the concentration of the solution, washing the pulp with water until it is substantially free from alkali, and boiling the washed pulp with water for a period of 15–45 minutes under atmospheric pressure.

2. Process for purifying wood pulps having an alpha-cellulose content above 85% and a pentosan content below 3.5%, which consists in introducing the pulp into 9 to 12 times its weight on an air dry basis of an aqueous caustic soda solution of 17–19% concentration which is already at a temperature of 50°–55° C., maintaining the mixture of pulp and alkali solution within this temperature range for 45–90 minutes, removing the greater part of the alkali solution from the treated pulp while maintaining the concentration of the solution, washing the pulp with water until it is substantially free from alkali, and boiling the washed pulp with water for a period of 15 to 45 minutes under atmospheric pressure.

3. Process for purifying wood pulps having an alpha-cellulose content above 85% and a pentosan content below 3.5% whereby there is obtained a cellulose suitable for esterification, which comprises treating the pulp with 9 to 12 times its weight on an air dry basis of an aqueous caustic soda solution of 17–19% concentration at a temperature of 50°–55° C. for 45 to 90 minutes as the only chemical purifying operation, then removing the greater part of the alkali solution from the treated pulp while maintaining the concentration of the solution, washing the pulp first with water and then with acidified water containing at most 0.5% of acid until the pulp is free from alkali, and boiling the washed pulp with water for a period of 15 to 45 minutes under atmospheric pressure.

4. Process for purifying wood pulps having an alpha-cellulose content above 85% and a pentosan content below 3.5% whereby there is obtained a cellulose suitable for esterification, which comprises treating the pulp with 9 to 12 times its weight on an air dry basis of an aqueous caustic soda solution of 17–19% concentration at a temperature of 50°–55° C. for 45 to 90 minutes as the only chemical purifying operation, then removing the greater part of the alkali solution from the treated pulp while maintaining the concentration of the solution, washing the pulp with water until it is substantially free from alkali, and boiling the washed pulp with acidified water containing at most 0.5% of acid for a period of 15 to 45 minutes under atmospheric pressure.

STANLEY CHARLES BATE.
FRANCIS GEORGE PEACH.
WALTER ALAN ROGERSON.

References Cited in the file of this patent

UNITED STATES PATENTS

| Number | Name | Date |
|---|---|---|
| 2,036,606 | Richter | Apr. 7, 1936 |
| 2,041,958 | Richter | May 26, 1936 |
| 2,054,854 | Dreyfus | Sept. 22, 1936 |
| 2,083,575 | Novak et al. | June 15, 1937 |
| 2,118,039 | Dreyfus | May 24, 1938 |
| 2,380,706 | Richter | July 31, 1945 |
| 2,385,259 | Collings et al. | Sept. 18, 1945 |
| 2,407,909 | Vincent et al. | Sept. 17, 1946 |

OTHER REFERENCES

Ott, Cellulose and Cellulose Derivatives, published by Interscience Publishers, Inc., New York, pp. 274, 275 and 278.

Ott, Cellulose and Cellulose Derivatives, published by Interscience Publishers, Inc., New York (1943), pp. 14 and 274–276.